United States Patent [19]

Cody

[11] Patent Number: 4,987,973
[45] Date of Patent: Jan. 29, 1991

[54] AUTOMOBILE SERVICING SYSTEM

[76] Inventor: Ralph F. Cody, 10865 Hutcheson Ferry Rd., Palmetto, Ga. 30268

[21] Appl. No.: 483,127

[22] Filed: Feb. 22, 1990

[51] Int. Cl.5 ............................................. F16N 33/00
[52] U.S. Cl. ..................................... 184/1.5; 184/106
[58] Field of Search ...................... 184/1.5, 2, 7.2, 7.3, 184/12, 106; 29/822, 823; 198/626, 627, 604, 465.3

[56] References Cited

U.S. PATENT DOCUMENTS

| | | | |
|---|---|---|---|
| 2,898,641 | 8/1959 | Battista | 198/604 |
| 4,674,586 | 6/1987 | Siemonsma | 184/106 |
| 4,789,047 | 12/1988 | Knobloch | 184/1.5 |

Primary Examiner—Ira S. Lazarus
Assistant Examiner—Alan B. Cariaso
Attorney, Agent, or Firm—James B. Middleton

[57] ABSTRACT

An automobile servicing system utilizes a continuously moving conveyor for moving automobiles over a pit. Workers within the pit attend to service steps requiring access to the underside of automobiles while other workers attend to service steps requiring access on the same level as the automobile. A collecting pan is moved with the automobile as it traverses the pit to allow fluid to be drained as the automobile moves with the conveyor. Fluid supply hoses are available in adjacent stations to refill and replenish fluids as needed. Vehicles are continually placed onto one end of the conveyor and are continually discharged from the opposite end, all servicing taking place while the vehicles move along the conveyor.

10 Claims, 3 Drawing Sheets

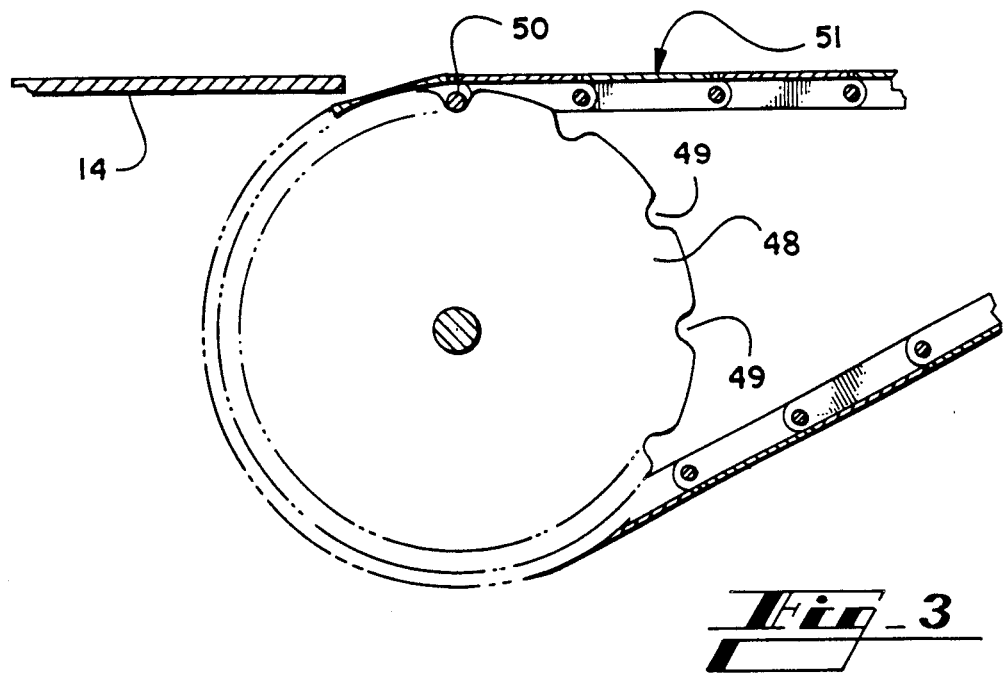
Fig_3
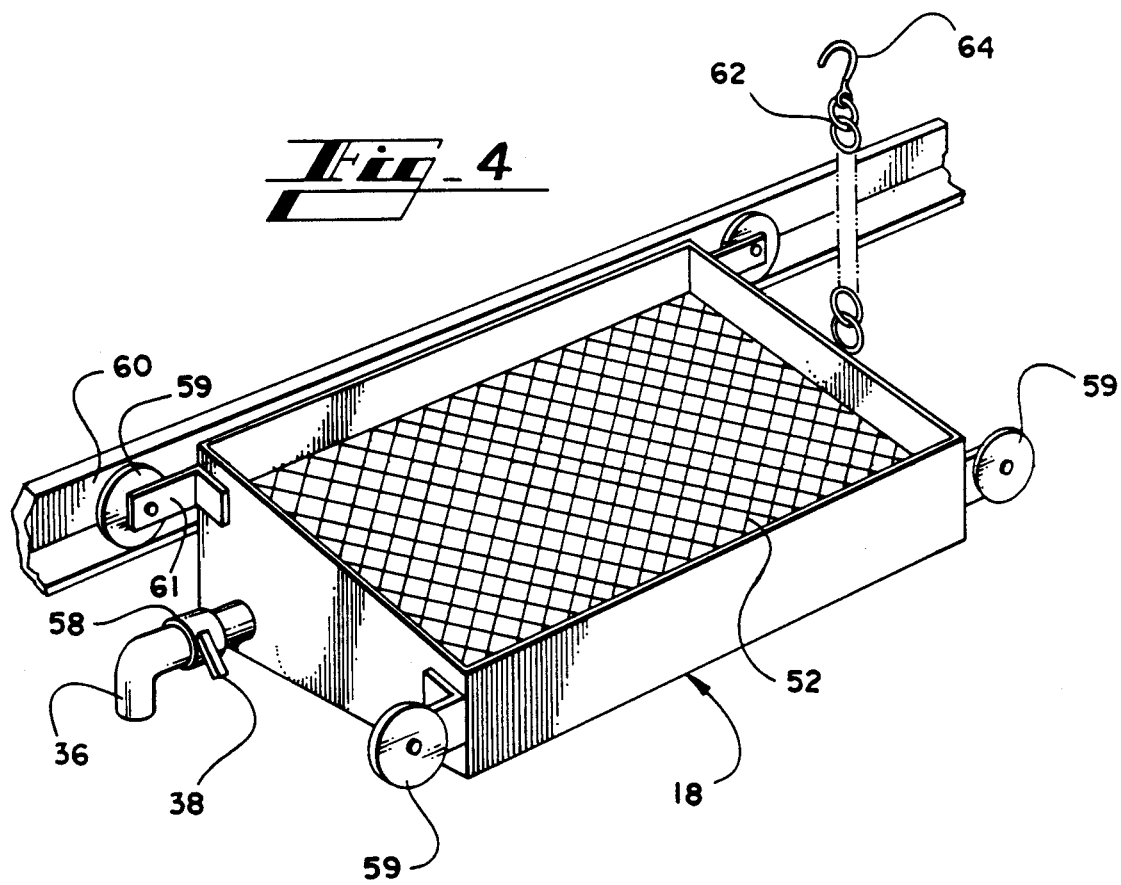
Fig_4

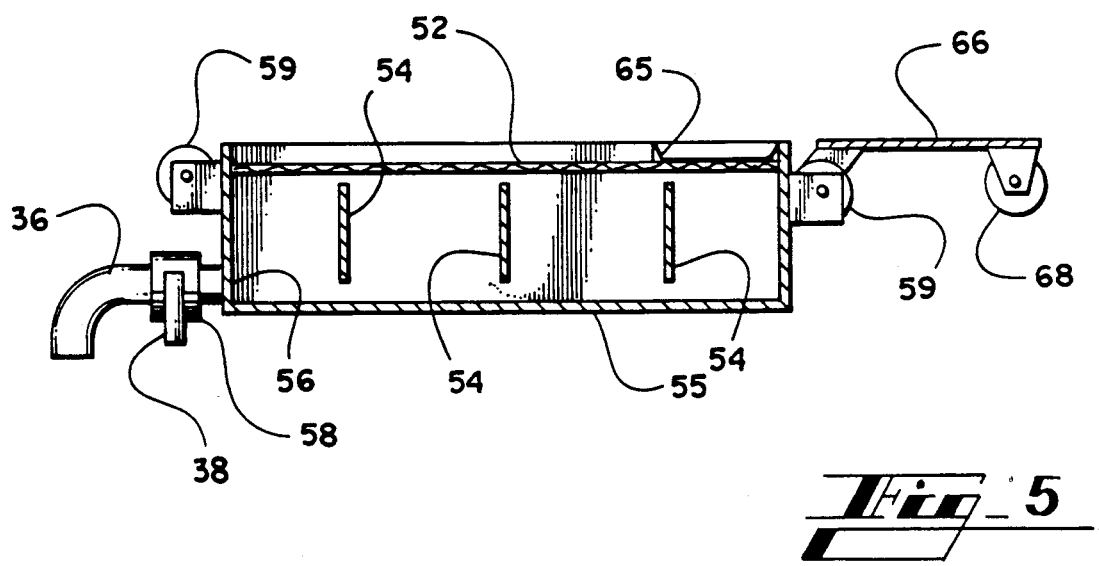
Fig_5
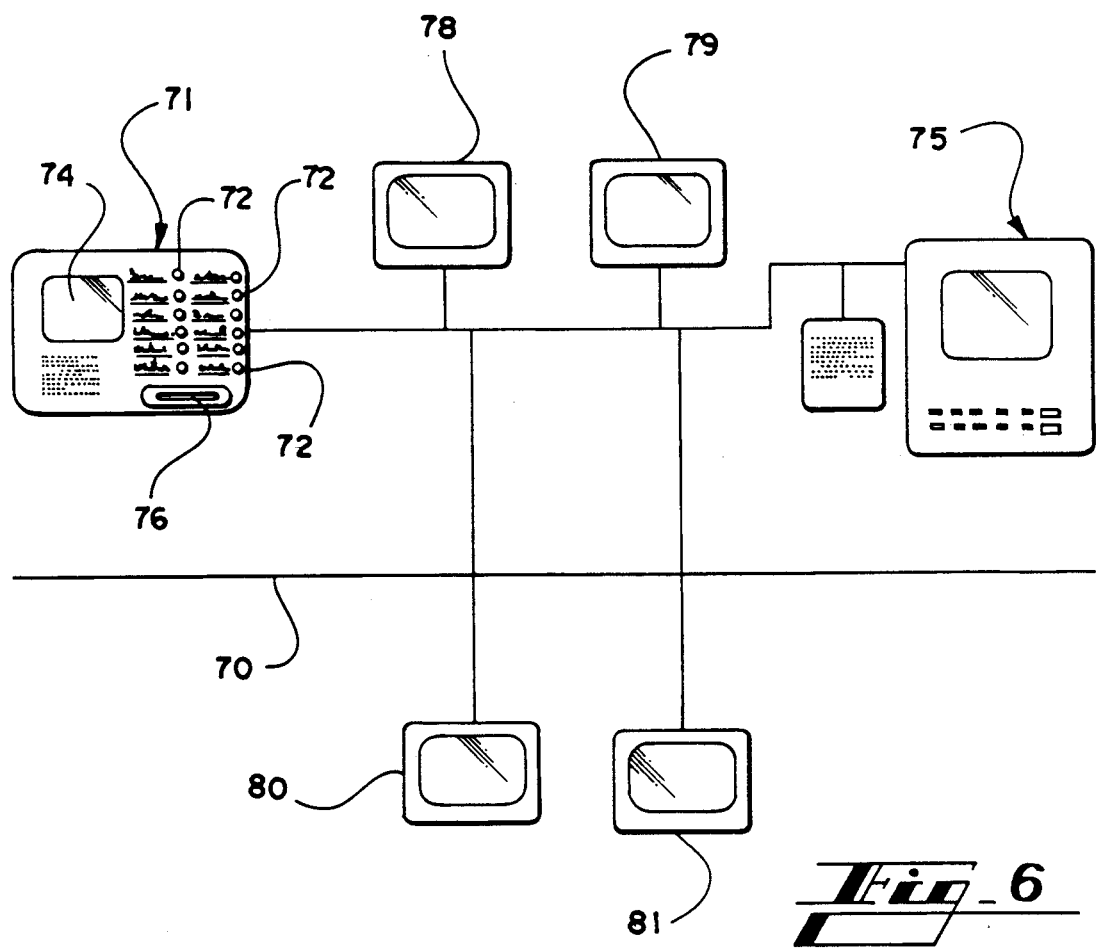
Fig_6

4,987,973

AUTOMOBILE SERVICING SYSTEM

INFORMATION DISCLOSURE STATEMENT

The general servicing of automobiles typically includes draining of crankcase oil, and the occasional draining of other fluids from the vehicle, and replacing the fluids. Also, fluids such as water for the battery, air for tires and the like are simply replenished as needed. Chassis lubrication is also supplied as needed. All of these are routine maintenance items that must be periodically performed in order to maintain the vehicle in good condition.

Throughout the history of the automobile, servicing has been provided by placing the automobile in a location to allow the required access, and rendering the service. The modern equipment to facilitate this service has taken the form of hydraulic lifts to lift the automobile and allow access to the under-side of the vehicle. A fluid collector mounted on wheels can be easily rolled into position beneath the vehicle, and a collecting pan can be raised or lowered for ease in collecting the fluid being drained. Since the vehicle is carried by a hydraulic lift, the height of the vehicle can be varied at will for access to the under-side of the chassis, or to the tires, or to the engine compartment. Even with the current proliferation of automobile service centers claiming full service in only a few minutes, the technique for the servicing is the same: the vehicle is lifted on a hydraulic lift, and workers drain and replace the various fluids. After the vehicle is completely serviced, the lift is lowered, and the vehicle is driven off, to be replaced by another.

SUMMARY OF THE INVENTION

This invention relates generally to a method and apparatus for servicing automobiles, and is more particularly concerned with a continuous system wherein successive automobiles enter one end of the system, are serviced, and are discharged at the opposite end of the system.

The present invention provides continuous conveying means for receiving vehicles thereon. The conveying means carries the vehicle while the vehicle straddles a central pit. A fluid receiving pan is movable along the pit, and is selectively attached to the vehicle for movement with the vehicle. Fluid supply means are provided within the pit for adding fluids that must be added beneath the vehicle, and fluid supply means are provided at the level of the vehicle to provide those fluids added on the level of the vehicle.

Due to the arrangement of the apparatus, the present invention allows a vehicle to be placed onto the conveying means, and the vehicle can be serviced while the vehicle moves along the conveyor. By the time the vehicle reaches the opposite end of the conveyor, service will be complete and the vehicle can be driven off. Meanwhile, additional vehicles can be placed on the conveying means immediately behind the first vehicle so a continuous stream of vehicles can be placed on one end of the conveying means, and the servicing of the plurality of vehicles can be continuous.

BRIEF DESCRIPTION OF THE DRAWINGS

These and other features and advantages of the present invention will become apparent from consideration of the following specification when taken in conjunction with the accompanying drawings in which:

FIG. 3 is a side elevational view showing one of the sprockets for driving the conveyor;

FIG. 4 is a perspective view showing the collecting pan illustrated in FIGS. 1 and 2 of the drawings;

FIG. 5 is a longitudinal cross-sectional view through a modified form of the collecting pan shown in FIG. 4; and, FIG. 6 is a rather schematic illustration showing one form of communication means for use in the system of the present invention.

DETAILED DESCRIPTION OF THE EMBODIMENT

Figure 1:
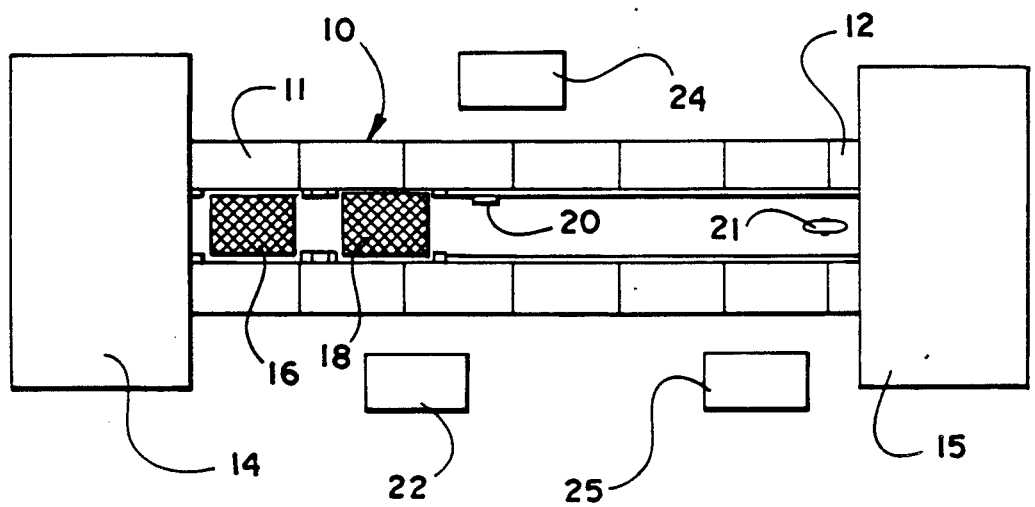
FIG. 1 is a top plan view showing a continuous servicing apparatus made in accordance with the present invention.

Referring now particularly to the drawings, and to that embodiment of the invention here presented by way of illustration, FIG. 1 is a plan view showing a conveyor 10 having an entrance end 11 and a discharge end 12. It will of course be understood that the conveyor is mounted on sprockets so that the beginning and ending of the conveyor slope arcuately downwardly. The entrance end 11 of the conveyor 10 has an entry apron 14 to allow a vehicle to move from ground level onto the conveyor 10 smoothly, and the discharge end 12 of the conveyor has a discharge apron 15 to allow smooth discharge of the vehicle from the conveyor.

Generally at the entrance end of the conveyor 10, FIG. 1 shows a pair of collecting pans designated at 16 and 18. These collecting pans 16 and 18 straddle a pit 19 and are adapted to move therealong. These pans will be discussed in more detail hereinafter. Also within the pit 19, there is a reel 20 generally mid-way of the pit 19; and, there is a reel 21 generally at the discharge end of the pit 19. The reels 20 and 21 comprise fluid removal and supply means, and the reels are within the pit 19 in order to remove or supply fluids that are accessible from beneath the vehicle, such as the oil for transmission and differential.

Generally on the ground level, there are here shown three fluid filling stations designated at 22, 24, and 25. These fluid filling stations are shown in more detail in FIG. 2 of the drawings, but those skilled in the art will realize that many forms of specific apparatus might be used.

The placement of the fluid filling stations 22, 24 and 25 is such that the first station 22 is placed well within the entrance end 11 of the conveyor 10. Thus, about as soon as a vehicle is in position on the conveyor 10, the hoses from the filling station 22 can be utilized to add fluids to the vehicle. The filling station 24 is substantially centrally of the conveyor 10, and is on the opposite side of the conveyor from the filling station 22. As a result, the station 24 might be used in the event it is more convenient to fill from the opposite side. Furthermore, the filling station 24 can be used to begin filling fluids in a second vehicle while the station 22 is still in use for a vehicle that has been moved further down the conveyor 10.

The filling station 25 is reasonably close to the discharge end 12 of the conveyor 10. The station 25 is conveniently located in the event another hose will not reach the vehicle at this point; more importantly, it is common for a vehicle owner to decide rather at the last minute that he needs a particular fluid. With a last minute decision, other filling stations 22 and 24 may be in use on other vehicles, and the station 25 can be utilized to satisfy the customer.

From the above description, it will be realized that the present invention provides a continuous servicing system so that a vehicle can be driven across the entrance apron 14 and onto the conveyor 10. When the vehicle is resting on the conveyor 10, the engine can be turned off and the conveyor 10 will move the vehicle to traverse the pit 19 at a rate determined by the service center operators. As soon as the vehicle is straddling the pit 19, the oil plug can be pulled to allow oil to begin draining from the crankcase. One of the pans 16 or 18 will be placed under the oil pan to receive the oil being drained, and the pan will be connected to the vehicle to move with the vehicle along the conveyor 10. While the oil is draining, the radiator can be filled, automatic transmission fluid can be added, tires can be brought to appropriate pressure, etc. A worker within the pit 19 is appropriately located to check the level of oil in a manual transmission and in the differential, and these fluids can be replenished if necessary from supply reel 21.

Once a first vehicle has moved along the conveyor 10 sufficiently to free the entrance end 11, a second vehicle can be placed on the conveyor 10. Since there are two collecting pans 16 and 18, the first pan 18 will have been moved with the first vehicle, so the second pan 16 can be connected to the second vehicle for receiving draining fluids.

Due to the arrangement shown, it will be understood that one worker within the pit 19 can service several cars sequentially. Very little time is required to pull the oil plug and allow oil to begin draining. Once this step has been accomplished, the same worker can move to the next vehicle, pull the oil plug and allow the oil to begin to drain. Once the oil in the first vehicle has fully drained, the worker in the pit 19 can replace the oil plug and detach the pan 18 from the vehicle.

Due to the short time required to drain the crankcase, it is contemplated that only two collecting pans 16 and 18 will be required. It will nevertheless be understood by those skilled in the art that, if the conveyor 10 is extremely long, or if higher production is desired, a third and subsequent collecting pans such as the pans 16 and 18 can be added.

Figure 2:
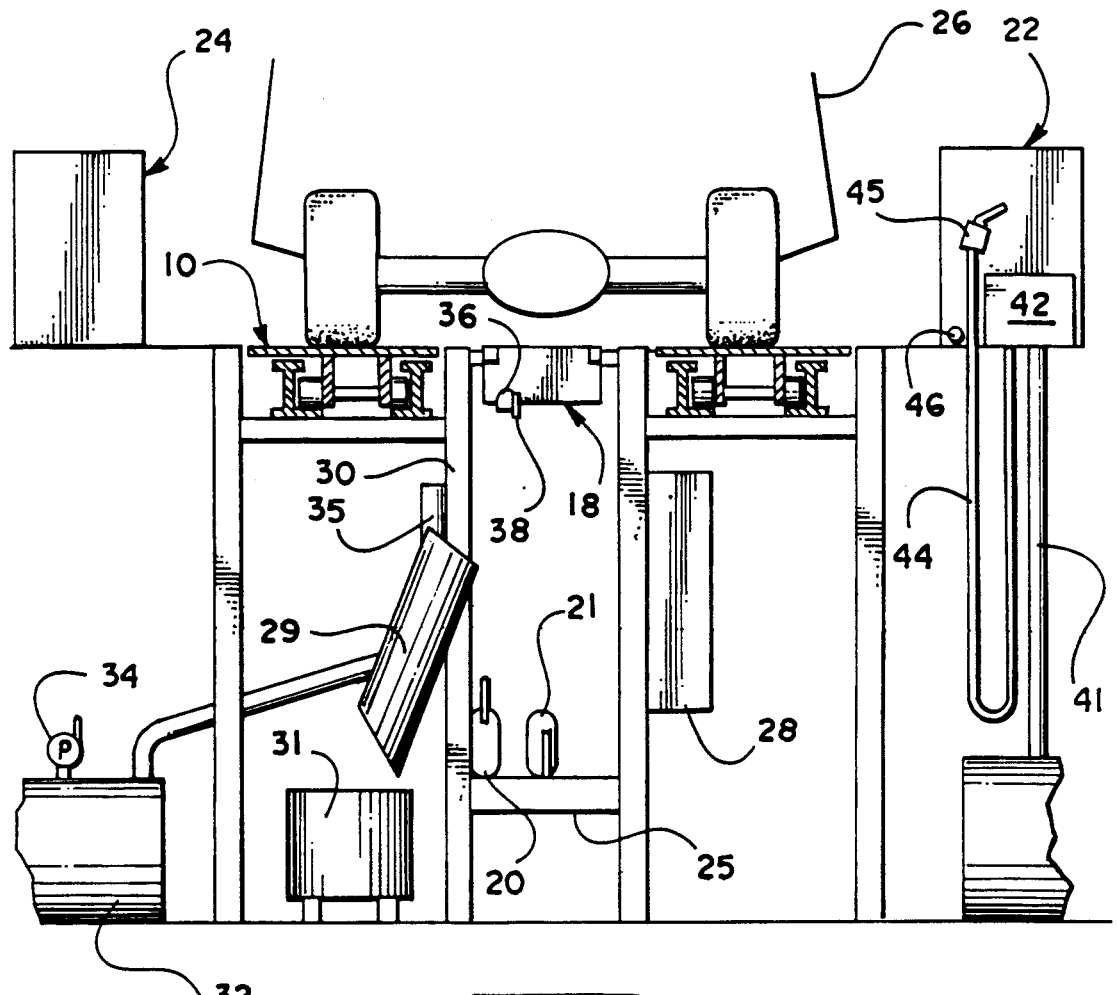
FIG. 2 is an enlarged transverse cross-sectional view through the servicing apparatus shown in FIG. 1.

Attention is next directed to FIG. 2 of the drawings for a more detailed description of the construction of the apparatus of the present invention. In FIG. 2 it will be seen that the pit 19 is simply a particular area constructed below the ground level. As illustrated in FIG. 2, the area of the below ground level is deeper than would be required simply for the pit 19, so the pit 19 includes a raised floor 25. The floor 25 will of course be placed at an appropriate depth to allow the average worker to stand on the floor 25 and reach the under-side of the vehicles designated at 26 as the vehicles 26 traverse the pit 19.

The below ground area is designed for maximum efficiency in servicing the vehicles carried by the conveyor 10. Since a worker within the pit 19 will remove oil filters and replace oil filters, there is storage in the underground area, a storage cabinet being designated at 28. While a single storage cabinet is here shown, it will be understood that similar cabinets can be placed throughout the length of the pit 19 to provide all materials required by the worker within the pit 19. To dispose of refuse, there is here shown a refuse chute 29, the chute 29 being carried by the standards 30 and discharging into a container 31. The container 31 is preferably on wheels or is otherwise easily movable so the container 31 can be quickly changed when it becomes filled.

Since the collecting pans 16 and 18 will receive various fluids drained from the automobiles being serviced, these collecting pans must occasionally be drained. It is contemplated that the pans will hold a considerable amount of fluid so that frequent emptying is not required; however, because the pans will hold a considerable amount of fluid, normal gravity draining could be very time consuming and could ruin the overall efficiency of the servicing system. As a result, the pan emptying system comprises a large storage tank 32 having a pump 34 for evacuating air from the tank 32. A hose 35 leads from the tank 32, and is selectively connectable to the drain pipe 36 on the collecting pan 18. The drain 36 includes a valve therein with a convenient operating handle 38. It will therefore be seen that the hose 35 can be connected to the drain 36, then the handle 38 manipulated to open the valve. At this point, the vacuum within the tank 32 will assist in pulling the fluid from the collecting pan 18 to shorten the drain time for the pan 18.

Looking no at the filling station 22 in FIG. 2 of the drawings, it will be observed that the station 22 utilizes a gravity hose return. While hoses are available on spring return reels, noticeable effort is required to extend the hoses from the reels. Since the present invention is intended to provide fast and efficient servicing means, the gravity return hose is preferred. Also, since the below ground area is required for installation of the conveyor and other apparatus previously described, the same under-ground area can be used as hose storage.

Those skilled in the art will understand that filling stations such as the station 22 typically include three or four hoses or more, but only one hose is here shown by way of example, and the arrangement is shown rather schematically, such apparatus being well known to those skilled in the art.

In the below ground area, there is a supply tank 40 having a pipe 41 leading to a pump 42 within the station 22. The pump 42 supplies fluid to the hose 44 to which a nozzle 45 is connected. The nozzle 45 is a metering nozzle so fluids can be delivered in discrete quantities when desired.

Those skilled in the art will understand that current automobiles have crankcases with many different capacities. Furthermore, since many automobiles in the United States are made in other parts of the world, the crankcases are frequently measured in liters rather than quarts and the quantity of oil needed will not necessarily be a discrete number of quarts. Thus, the use of the metering nozzle 45 is important in order to dispense whatever quantity is required by the specific vehicle. Of course the same type of nozzle is useful for such fluids as transmission and differential oil. Though one might deliver the fluids simply until the transmission is filled to the proper level, one must know the quantity in order to charge the appropriate price for the fluid.

The filling station 22 includes a plurality of rollers designated at 46, the rollers 46 surrounding the opening through which the hose 44 passes. It will therefore be understood that the only resistance to pulling the hose 44 is the weight of the hose itself. Use of the rollers 46 reduces the frictional drag so the hose 44 is very easy to pull to its full length. When the hose is to be returned, it is a gravity return so that return is easy and uniform.

Looking briefly at FIG. 1 of the drawing, and considering FIG. 2, it is contemplated that the hoses, such as the hose 44, will have sufficient length to reach approximately half the length of the conveyor 10. As a result, hoses from the stations 22 and 24 will be able to reach to the entrance end 11 of the conveyor 10, and substantially to the exit end 12 of the conveyor 10. Hoses from the station 25 will not be able to reach the entrance end, but it is available for providing fluid required at the discharge end of the system.

Still looking at FIGS. 1 and 2, it will be seen that the conveyor 10 comprises a pair of conveyor chains, one on each side of the pit 19. Though many forms of conveyor chain might be utilized by those skilled in the art, it has been found that the type of conveyor chain utilized in automobile assembly plants is quite effective. As is shown in FIG. 2 of the drawings, the conveyor is designed to be supported on railroad rails, and the surface of the chain is made up of flat plates that easily receive a vehicle. It has been found that plates should have a width in the vicinity of two feet simply to provide the needed latitude for servicing all of the small vehicles encountered. The pit 19 can be around three feet wide, with two feet wide conveyor chains on each side of the pit. This arrangement will receive the very small automobiles, and will include such things as pick-up trucks having double wheels. Obviously the conveyor could be arranged for specific sizes of vehicles and the dimensions could be different, or the conveyor could be arranged to receive an even greater variety of vehicles which would require even wider conveyor chains. Such decisions can be made in the final engineering of a specific installation.

Looking at FIG. 3 of the drawings, a sprocket for receiving one of the conveyor chains is shown. With the relatively short conveyors contemplated by the present invention, and the fact that the conveyor chains are on rollers throughout their length, the sprocket normally utilized for automobile assembly lines is not required. The sprocket shown in FIG. 3 is quite effective, and does not require the high tolerances of the prior art sprockets. It will be seen that the sprocket in FIG. 3 is designated at 48, the sprocket having a plurality of notches 49 extending completely around the circumference of the sprockets 48. Each of the notches 49 is formed as approximately a semicircle, the diameter of the circle of the notch lying generally along the circumference of the circle of the sprocket. At the circumference of the circle of the sprocket, the sides of the notch diverge. As a result, when one of the links 50 of the conveyor chain 51 is substantially aligned with a notch 49, the link 50 will easily fall into the notch 49. As is indicated in FIG. 3 of the drawings, the conveyor chain 51 extends around more than 180° of the sprocket 48, so there is adequate holding force between the sprocket 48 and the conveyor chain 51.

FIGS. 4 and 5 of the drawings show the collecting pan 18 in more detail. Here it will be seen that the collecting pan 18 comprises simply a rectangular pan having a screened top 52. The screen 52 will be relatively strong material, such as expanded metal, to allow oil filters, tools and the like to be placed thereon without damage. Due to the size of the pan 18, reinforcing struts 54 extend laterally across the pan, internally thereof as is shown in FIG. 5. It will be seen that the struts 54 are above the bottom 55 of the pan, and this is to prevent dividing the pan 18 into separate compartments.

As has been previously discussed, there is a drain 36 extending from the end wall 56 of the pan 18, the drain 36 including a valve 58 having the operating handle 38. When the pan is in use, the valve 58 will be closed; but, when the pan is to be drained, the handle 38 will be manipulated to open the valve 58 and drain the pan as has been previously described.

The collecting pan 18 has rollers 59 generally at its four corners. All the rollers 59 are alike, so only one will be described in detail, and the same reference numerals are applied to all four of the rollers.

The pit 19 has tracks 60 at each side thereof, and the two tracks 60 are spaced apart an appropriate distance to receive the rollers 59 on the pan 18. As here shown, there is an angled bracket 61 fixed to the pan 18, and carrying the roller 59. Obviously many other forms of roller construction can be utilized, the only object being to provide means for allowing the pan 18 to roll easily along the pit 19.

FIG. 4 of the drawings illustrates a means for connecting the pan 18 to a vehicle. In FIG. 4 there is illustrated a chain 62 fixed to the pan 18, the chain terminating in a hook 64 to be received by the vehicle.

FIG. 5 of the drawings shows other possible alternatives. In FIG. 5 it will be noted that there is a tray 65 at the forward portion of the pan 18, the tray 65 simply resting on the screen 52. Such a tray might be utilized to carry tools or the like that are required by the worker. Also, FIG. 5 shows a platform 66, the platform 66 being connected to one of the rollers 59, and having an additional roller 68. If desired, the platform 66 can be provided to allow a worker to stand on the platform in order to be directly over the pit 19 and in front of the vehicle for servicing.

Looking now at FIG. 6 of the drawings, it will be realized that, for a system such as that described above, there must necessarily be some means for communicating to the workers the service to be performed on the various vehicles. FIG. 6 shows schematically one system that might be utilized.

In FIG. 6, the line 70 indicates the ground line, so the equipment above the line 70 will be above ground level, and the equipment below the line 70 will be within the pit 19. With this in mind, an input station is designated at 71, the input station having a plurality of selector buttons 72 whereby a customer can select the various services desired. By way of example, the customer may push one button to indicate an oil change, another button to indicate that the antifreeze should be checked, another button to indicate the chassis should be lubricated etc. A display screen 74 will provide a readout of the items selected by the customer so the customer can be sure he has selected the items he wishes. The station 71 is in communication with the terminal generally indicated at 75. A service manager or the like will be at the terminal 75 and will communicate with the customer at the station 71. The terminal 75 will maintain control of the system, and will allow prices to be indicated, and problems explained to the customer. Once the customer is satisfied with the selections made, a ticket will be dispensed from the slot 76 so the customer will have something in print showing his choices.

When the complete service for one vehicle has been decided through the terminal 71, all of the remote terminals 78, 79, 80 and 81 will show the service to be performed. Thus, both workers above ground and the workers in the pit 19 will have the information as to what services is to be performed on the current vehicle. When the vehicle has been fully serviced, a signal from the terminal 75 can clear the remote terminals to allow space for additional vehicles. It is well known in the art to utilize terminals such as the remote terminals 78–81, and to divide the screens so that service for two or more vehicles may be displayed at the same time. Those skilled in the art will devise this and other systems without further explanation.

From the foregoing description, it will be understood that the present invention provides an extremely efficient servicing means for automobiles and other vehicles. Since the conveyor 10 will normally be variable in speed, the speed can be increased or decreased for the rate of service to be performed. If very few workers are available, the conveyor speed can be slowed somewhat to allow the few workers to service the vehicles before they traverse the pit 19. If more workers are available, the conveyor speed can be increased to allow higher production. In any event, the system of the present invention is such that only two workers can easily service approximately 100 cars per day. Utilizing a larger work crew and running the conveyor at a sufficient speed, it is possible for the present system to allow the servicing of vehicles at the rate of 2 vehicles per minute. Thus, the system is sufficiently flexible that it can be used in relatively small installations allowing a very few people to service a reasonable volume of vehicles. The same system can be utilized in larger installations wherein a greater number of workers can achieve extremely high volume. In either case, since the vehicles can be continuously placed into the system from one end and discharged from the system at the opposite end, there are no delays in shifting vehicles, or in raising and lowering hydraulic racks or the like. The entire installation is designed for ease of use, and for use as the vehicle moves along the conveyor.

It will of course be understood by those skilled in the art that the particular embodiment of the invention here presented is by way of illustration only, and is meant to be in no way restrictive; therefore, numerous changes and modifications may be made and the full use of equivalents resorted to, without departing from the spirit or scope of the invention as outlined in the appended claims.

What is claimed:

1. Automobile servicing apparatus comprising conveyor means for receiving at least one automobile thereon for servicing, said conveyor means including a pair of parallel chains and defining a pit between said pair of chains, pan means movable with an automobile on said conveyor means for receiving fluid draining from the automobile, and at least one fluid delivery means for replenishing fluids in the automobile as the automobile moves along said conveyor means.

2. Automobile servicing apparatus as claimed in claim 1, said pan means including a collecting pan having a plurality of rollers, a pair of tracks disposed along opposite sides of said pit, said plurality of rollers engaging said pair of tracks so that said collecting pan is movable along the length of said pit, and means for selectively fixing said collecting pan to an automobile received on said conveyor means.

3. Automobile servicing apparatus as claimed in claim 2, said collecting pan including a drain, and a valve between said pan and said drain, said servicing apparatus further including emptying means for said collecting pan, said emptying means comprising a tank, means for drawing a vacuum on said tank, and a hose for selectively connecting said tank to said drain on said collecting pan.

4. Automobile servicing apparatus as claimed in claim 1, said at least one fluid delivery means comprising a first fluid delivery means within said pit for delivering fluid to the underside of an automobile on said conveyor means, and a second fluid delivery means adjacent to said conveyor means for delivering fluid to the upper side of the automobile.

5. Automobile servicing apparatus as claimed in claim 4, said second fluid delivery means including a storage tank for receiving a quantity of fluid, a delivery hose, a delivery nozzle at the extreme end of said delivery hose, pump means for causing fluid within said storage tank to move through said delivery hose and to said delivery nozzle.

6. Automobile servicing apparatus as claimed in claim 5, said second fluid delivery means further including a filling station adjacent to said conveyor means, said filling station defining an opening for receiving said delivery hose therethrough, the arrangement being such that said delivery hose passes through said opening by means of gravity so that said delivery hose is readily extendible.

7. A method for servicing automobiles including the steps of placing a first automobile on a continuously moving conveyor for moving said first automobile over a pit, draining fluids from said first automobile as said first automobile traverses said pit, supplying fluids to said first automobile as said first automobile is carried by said conveyor, and discharging said first automobile from said conveyor.

8. A method as claimed in claim 7, and further including the step of placing a second automobile on said conveyor after said first automobile has moved sufficiently to provide space on said conveyor for said second automobile, and draining fluids from said second automobile as said second automobile traverses said pit, supplying fluids to said second automobile as said second automobile is carried by said conveyor, and discharging said second automobile from said conveyor.

9. A method as claimed in claim 7, and further including the step of attaching a collecting pan to said first automobile for movement with said first automobile as said first automobile traverses said pit.

10. A method as claimed in claim 9, and including the step of subsequently draining said collecting pan, said step of draining said collecting pan including the step of connecting an evacuated tank to a drain on said collecting pan for quick removal of fluid in said collecting pan.

* * * * *